United States Patent [19]
Andrich

[11] 3,924,831
[45] Dec. 9, 1975

[54] FLUID COUPLING
[76] Inventor: John Andrich, M. R. No. 5, Titusville, Pa. 16354
[22] Filed: Nov. 18, 1974
[21] Appl. No.: 524,667

[52] U.S. Cl. .............................. 251/149.7; 285/321
[51] Int. Cl.² .......................................... F16L 37/28
[58] Field of Search ..................... 251/149.6, 149.7; 137/543.19; 285/321

[56] References Cited
UNITED STATES PATENTS

| | | | |
|---|---|---|---|
| 2,226,826 | 12/1940 | Miller | 285/321 X |
| 2,730,382 | 1/1956 | De Mastri | 251/149.6 X |
| 2,934,085 | 4/1960 | Mylander | 137/543.19 |
| 3,035,617 | 5/1962 | Bleitenstein | 251/149.7 X |
| 3,532,101 | 10/1970 | Snyder, Jr. | 251/149.7 X |

Primary Examiner—William R. Cline

[57] ABSTRACT

A fluid coupling having interfitting male and female bodies with a spring actuated check valve in the female body. The check valve is engaged by the male body and thereby opened. The male member has a circumferential groove and the female member has a ring, L-shaped in cross section, affixed to its outer end. The ring may define a groove in the female member in which an O-ring is disposed, the O-ring being suitable to snap into the groove in the male member and hold it in place. A molding ring as a separate part makes it possible to mold the entire coupling from a thermoplastic material.

1 Claim, 2 Drawing Figures

FLUID COUPLING

REFERENCE TO PRIOR ART

The coupling disclosed herein is of the general type shown in U.S. Pat. No. 3,537,478 and U.S. Pat. No. 3,447,819.

OBJECTS OF THE INVENTION

It is an object of the invention to provide an improved coupling.

Another object of the invention is to provide an improved method for forming a coupling.

Another object of the invention is to provide an interfitting snap coupling that is simple in construction, economical to manufacture, and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

GENERAL DESCRIPTION OF THE DRAWINGS

DETAILED DESCRIPTION OF THE DRAWINGS

Figures 1, 2:
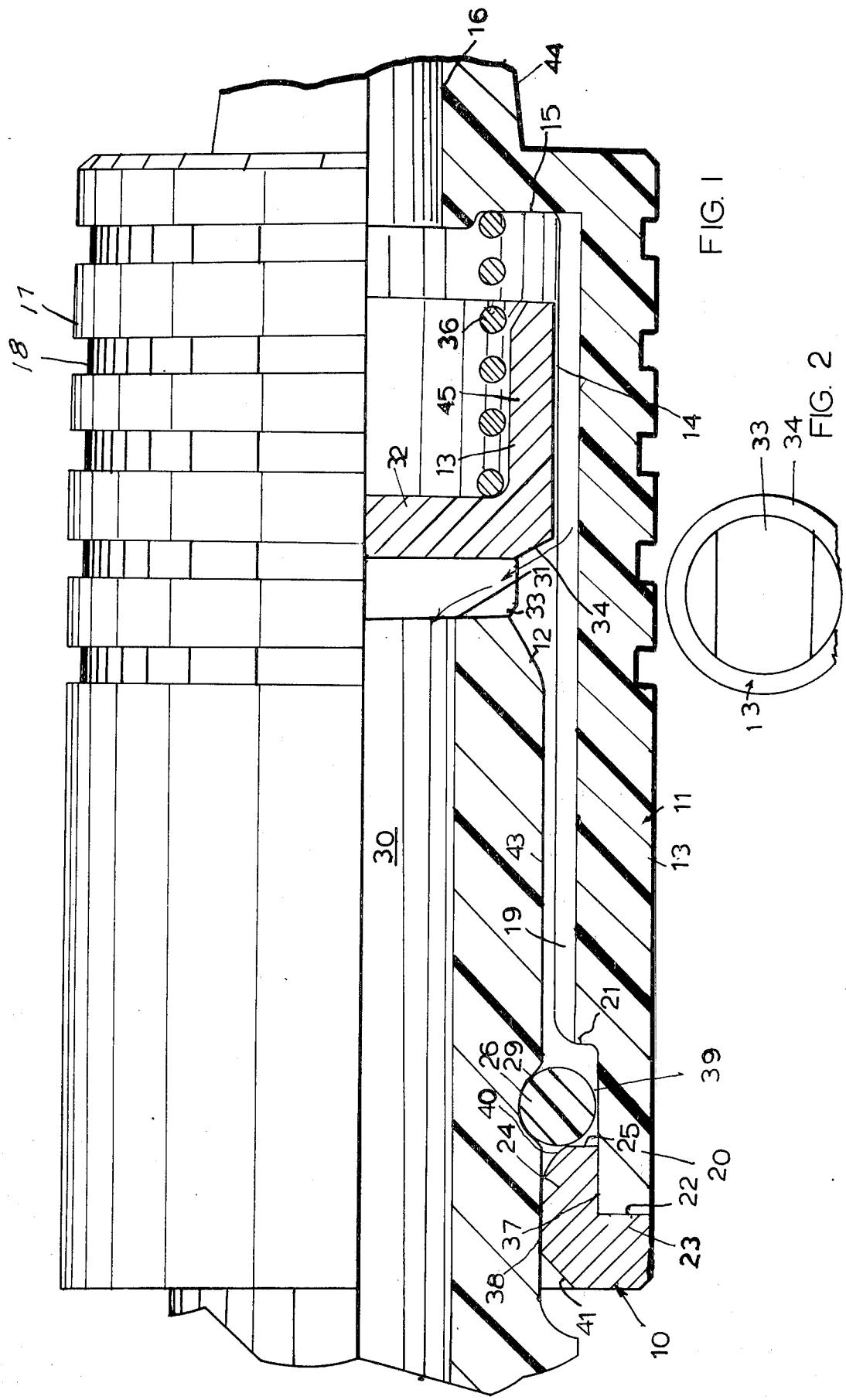
FIG. 1 shows a side view partly in cross section of a coupling according to the invention.
FIG. 2 is an end view of the check valve.

The coupling disclosed herein is made up generally of a hollow female body member 11, a hollow male member 12, end ring 10, check valve 13, resilient ring 26, and a spring 36. The coupling may be used to connect to the ends of two fluid lines.

The female body member 11 has a hollow bore therethrough extending from the inlet 16 to the outlet at wall 15. The counterbore 39 provides a space for the flange 24 of the ring 10 and provides a space for the O-ring when the end ring 10 is assembled to the female body member as shown in the drawing.

An inlet member 16 is formed in the female body member which communicates with the hollow bore. A suitable connection can be provided for connecting the coupling in a fluid line at 44. Circumferentially spaced ribs 19 are formed on the inner periphery of the female body member. The spaced ribs 19 extend from the inlet end to the counterbore shoulder 21 and provide spaces therebetween for fluid to flow and the ribs also provide a guiding surface for the check valve 13. Ribs 19 extend axially from wall 15 to shoulder 21.

The male member 12 has an outside generally cylindrical surface 43 in which a circumferential groove 29 is formed. The groove 29 receives the inner part of the sealing ring 26 which may be in the form of an O-ring as shown. A hollow bore 30 extends entirely through the axial center of the male member and terminates at the inner end at 31. The inner end of the male member engages the check valve at 31.

The check valve 13 is generally in the form of a round cup and it has a flange 45 that extends toward the inlet end. The spring 36 rests against the wall 15 of the female member and against the web 32 of the check valve and urges the check valve toward the open end of the female member and thereby forms a seal. A radial slot 33 is formed across the face of the check valve. The margins of slot 33 form means engaging the male member at 31. When the male member is removed from the female member, the sealing ring 26 prevents the check valve from moving out of the female member.

The end ring 10 has an inner peripheral cylindrical surface 38 that is slightly larger than the outer periphery of the cylindrical surface 43 on the male member so that the male member can freely enter the female member. The ring has a flange 24 that extends into the counterbore 39 of the female member and the ring may be bonded to the flange 20 at 37. The radial flange 23 of the ring may be bonded to the end of the female member at 22. The ring 10 is chamfered at 41 and the inner corner of the ring 10 is rounded at 40. The end surface 25 of the ring 10 and the shoulder 21 forms the bottom of the counterbore 39, together with the inner peripheral surface of the counterbore, form a groove which receives the sealing ring 26. By making the body with the ring 23, a simpler manufacturing procedure can be used.

When the coupling is assembled in the manner shown in the drawing with the male member inserted in the female member, ring 26 rests in groove 29 and check valve 13 is forced to the position shown compressing spring 36. A flow passage is formed from inlet 16 through the space between ribs 19 through slot 33 to the bore through male member 12.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privelege is claimed are defined as follows:

1. A coupling comprising a male member,
   a hollow female member having a first end and a second end,
   means adapted to connect a source of fluid to said second end of said female member,
   said female member having a bore extending therethrough defining said hollow and a counterbore in the said first end of said female member defining a flange,
   axially extending ribs in said female member extending from said second end to the bottom of said counterbore,
   the said bottom of said counterbore defining a shoulder,
   a ring L-shaped in cross section having one leg of said L-shape inserted in said counterbore and terminating in spaced relation to the shoulder defined by said bottom of said counterbore defining a groove,
   a resilient O-ring in said groove defined by said counterbore and said ring,
   an external groove in said male member,
   said resilient O-ring being adapted to extend into said groove in said male member when said male member is holding said members together,
   a cup-shaped check valve in said female member,
   a spring having one end received in said cup-shaped check valve, the other end of said spring engaging the said second end of said female member urging said check valve into engagement with said resilient O-ring, said check valve terminating in an end surface opposite said cup-shaped side,
a radial groove in said end of said check valve opposite said cup-shaped side,
and an end of said male member being adapted to engage said check valve over said groove,
said check valve defining a passage for fluid flow through said coupling from said second end of said female member between said check valve and said ribs through said radial groove and through a bore in said male member.

* * * * *